US011194521B1

(12) United States Patent
Gorobets et al.

(10) Patent No.: US 11,194,521 B1
(45) Date of Patent: Dec. 7, 2021

(54) RATE LIMIT ON THE TRANSITIONS OF STREAMS TO OPEN

(71) Applicant: Western Digital Technologies, Inc., San Jose, CA (US)

(72) Inventors: Sergey Anatolievich Gorobets, Edinburgh (GB); Daniel L. Helmick, Broomfield, CO (US); Liam Parker, Edinburgh (GB)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/885,076

(22) Filed: May 27, 2020

(51) Int. Cl.
*G06F 3/06* (2006.01)
*G06F 11/10* (2006.01)

(52) U.S. Cl.
CPC .......... *G06F 3/0659* (2013.01); *G06F 3/0604* (2013.01); *G06F 3/065* (2013.01); *G06F 3/068* (2013.01); *G06F 11/1068* (2013.01)

(58) Field of Classification Search
CPC ...... G06F 3/0659; G06F 3/0604; G06F 3/065; G06F 3/068; G06F 11/1068
See application file for complete search history.

(56) References Cited

U.S. PATENT DOCUMENTS

| 8,046,522 | B2 | 10/2011 | Sinclair et al. |
| 9,836,232 | B1 | 12/2017 | Vasquez et al. |
| 2007/0033375 | A1 | 2/2007 | Sinclair et al. |
| 2010/0174869 | A1 | 7/2010 | Gorobets et al. |
| 2012/0254174 | A1 | 10/2012 | Mitra et al. |
| 2014/0351527 | A1* | 11/2014 | Traut .................... G06F 3/0689 711/154 |
| 2019/0012270 | A1* | 1/2019 | Imazaki ............. G06F 11/1076 |
| 2019/0266046 | A1* | 8/2019 | Bahirat .................. G06F 11/10 |
| 2020/0089407 | A1 | 3/2020 | Baca et al. |
| 2020/0293401 | A1* | 9/2020 | Lee ........................ G06F 3/0604 |
| 2021/0096945 | A1* | 4/2021 | Kotzur .................. G06F 3/0659 |
| 2021/0149797 | A1 | 5/2021 | Kanno et al. |
| 2021/0182202 | A1 | 6/2021 | Jin et al. |

OTHER PUBLICATIONS

International Search Report and the Written Opinion for International Application No. PCT/US2020/066116 dated Mar. 25, 2021, 15 pages.

* cited by examiner

*Primary Examiner* — Nanci N Wong
(74) *Attorney, Agent, or Firm* — Patterson & Sheridan, LLP; Steven H. Versteeg

(57) ABSTRACT

The present disclosure generally relates to methods of operating storage devices. The storage device comprises a controller comprising first random access memory (RAM1), second random access memory (RAM2), and a storage unit divided into a plurality of streams. The controller restricts the host to a maximum number of streams that can be in the open and active state at a time. Open streams can be switched to the closed state, and vice versa, upon a predetermined amount of time expiring. The maximum number of open streams is based on one or more amounts of time to: generate parity data, copy the parity data from the RAM2 to the RAM1, update the parity data, switch a stream from the open and active state to the closed state, and the amount of space in a temporary RAM1 buffer.

18 Claims, 7 Drawing Sheets

RATE LIMIT ON THE TRANSITIONS OF STREAMS TO OPEN

BACKGROUND OF THE DISCLOSURE

Field of the Disclosure

Embodiments of the present disclosure generally relate to storage devices, such as solid state drives (SSDs).

Description of the Related Art

Storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. The data is read and written to one or more erase blocks in the memory device. Each of the erase blocks is associated with a logical block address so that the SSD and/or the host device know the location of where the data is stored. One or more erase blocks may be grouped together by their respective logical block addresses to form a plurality of streams.

As a command is received by the storage device to write data to a particular stream, the data associated with the command is written to the memory device and parity data is simultaneously generated for the data in order to protect the data. The parity data is then stored in volatile memory within the storage device. However, the storage device generally comprises a very limited amount of volatile memory, such as SRAM and DRAM, as volatile memory is expensive. Since multiple streams may be open at the same time, the data being written to the volatile memory takes up a lot of valuable volatile memory space, which may reduce the amount of volatile memory available for other data, or may require a greater amount of volatile memory to be included in the storage device. Moreover, transferring data between the various volatile memories may take a long period of time, causing write delays for the storage device.

Therefore, what is needed is a new method of generating and storing data in a storage device.

SUMMARY OF THE DISCLOSURE

The present disclosure generally relates to methods of operating storage devices. The storage device comprises a controller comprising first random access memory (RAM1), second random access memory (RAM2), and a storage unit divided into a plurality of streams. The controller restricts the host to a maximum number of streams that can be in the open and active state at a time. Open streams can be switched to the closed state, and vice versa, upon a predetermined amount of time expiring. The maximum number of open streams is based on one or more amounts of time to: generate parity data, copy the parity data from the RAM2 to the RAM1, update the parity data, switch a stream from the open and active state to the closed state, and the amount of space in a temporary RAM1 buffer.

In one embodiment, a storage device comprises a non-volatile storage unit, wherein the capacity of the non-volatile storage unit is divided into a plurality of streams. The non-volatile storage unit comprises a plurality of dies and each of the plurality of dies comprising a plurality of erase blocks. The storage device further comprises a first volatile memory unit and a controller coupled to the non-volatile storage unit and the first volatile memory unit. The controller comprises a second volatile memory unit, wherein the controller is configured to set a maximum number of open and active streams and receive one or more first commands to write data to one or more open and active streams of the plurality of streams. The controller is further configured to receive one or more second commands to write data to a first stream, wherein the first stream is in a closed or resource conserved lower performance internal state, change a least recently used open and active stream to the closed or resource conserved lower performance internal state, and change the first stream to an open and active state.

In another embodiment, a storage device comprises a non-volatile storage unit, wherein the capacity of the non-volatile storage unit is divided into a plurality of streams. The non-volatile storage unit comprises a plurality of dies and each of the plurality of dies comprising a plurality of erase blocks. The storage device further comprises a first volatile memory unit and a controller coupled to the non-volatile storage unit and the first volatile memory unit. The controller comprises a second volatile memory unit, wherein the controller is configured to set a maximum number of open and active streams, receive one or more commands to write data to one or more open and active streams of the plurality of streams, and generate new first parity data for a first open and active stream in a temporary location of one or more temporary locations in the second volatile memory unit. The controller is further configured to copy previous first parity data for the first open and active stream from the first volatile memory unit to a first location in the second volatile memory unit. The controller is also configured to update the previous first parity data with the new first parity data in the second volatile memory unit, wherein an amount of time the generating the new first parity data, copying the previous first parity data, and updating the previous first parity data takes determines the maximum number of open and active streams.

In another embodiment, a storage device comprises a non-volatile storage unit, wherein the capacity of the non-volatile storage unit is divided into a plurality of streams. The non-volatile storage unit comprises a plurality of dies and each of the plurality of dies comprising a plurality of erase blocks. The storage device further comprises a first volatile memory unit and a controller coupled to the non-volatile storage unit and the first volatile memory unit. The controller comprises a second volatile memory unit, wherein the second volatile memory comprises one or more temporary locations. The controller is configured to set a maximum number of open and active streams, wherein the maximum number of open and active streams is determined based on a number of temporary locations in the second volatile memory and receive one or more first commands to write data to one or more open and active streams of the plurality of streams. The controller is further configured to generate new first parity data for a first open and active stream in a first temporary location in the second volatile memory unit, change a second open and active stream to a closed or resource conserved lower performance internal state upon receiving one or more second commands to write data to a closed stream, and change the closed stream to an open and active state.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 illustrates a schematic diagram of updating data in flight over time in the storage device, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to methods of operating storage devices. The storage device comprises a controller comprising first random access memory (RAM1), second random access memory (RAM2), and a storage unit divided into a plurality of streams. The controller restricts the host to a maximum number of streams that can be in the open and active state at a time. Open streams can be switched to the closed state, and vice versa, upon a predetermined amount of time expiring. The maximum number of open streams is based on one or more amounts of time to: generate parity data, copy the parity data from the RAM2 to the RAM1, update the parity data, switch a stream from the open and active state to the closed state, and the amount of space in a temporary RAM1 buffer.

Figure 1:
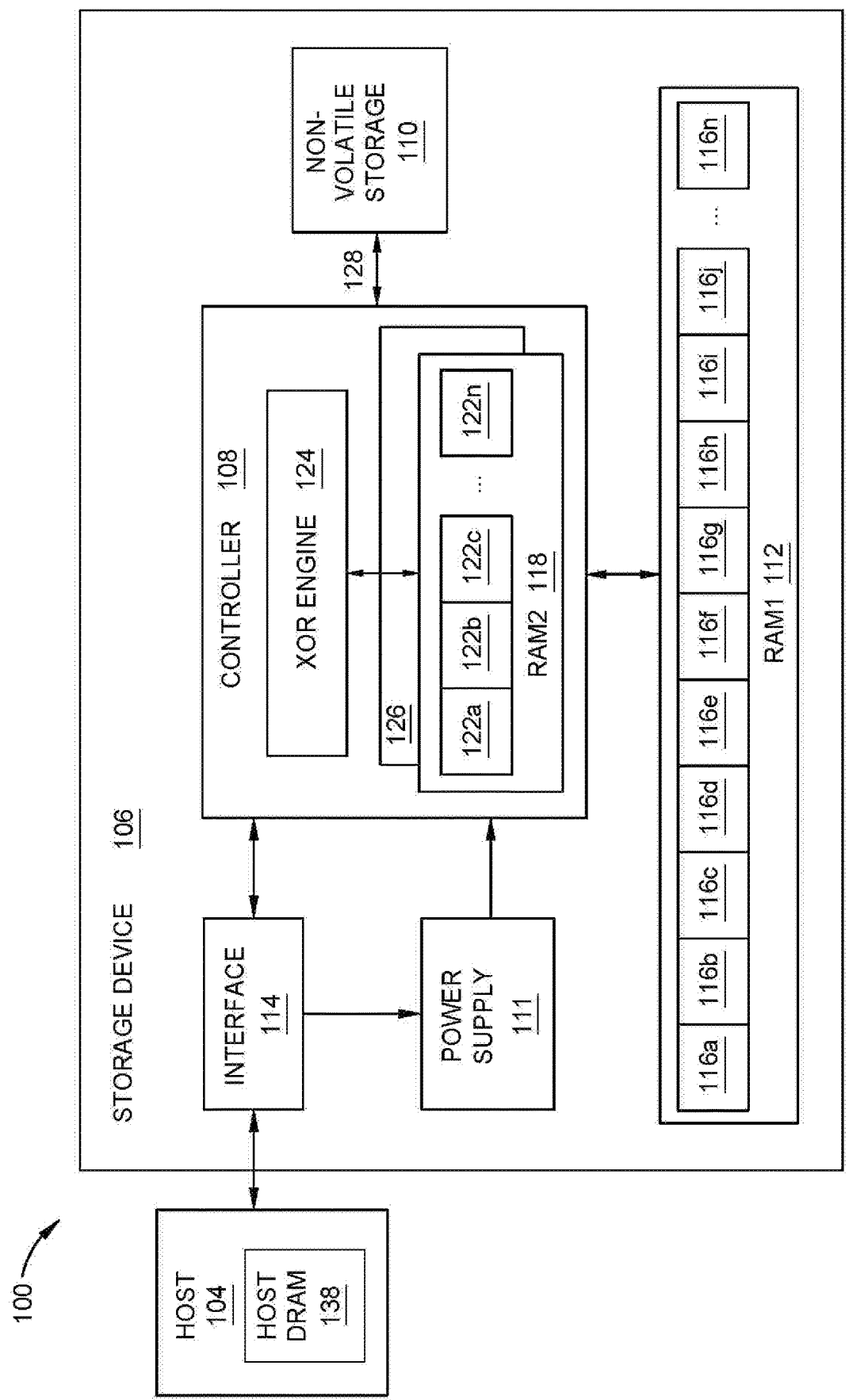
FIG. 1 is a schematic block diagram illustrating a storage system, according to one embodiment.

FIG. 1 is a schematic block diagram illustrating a storage system 100 in which storage device 106 may function as a storage device for a host device 104, in accordance with one or more techniques of this disclosure. For instance, the host device 104 may utilize a storage unit 110, such as non-volatile memory, included in storage device 106 to store and retrieve data. The storage unit 110 may be any type of non-volatile memory, such as MRAM, NAND, NOR, or HDD, for example. In the following descriptions, the storage unit 110 is referenced as a non-volatile memory (NVM) 110 for simplification and exemplary purposes. The host device 104 comprises a host DRAM 138. In some examples, the storage system 100 may include a plurality of storage devices, such as the storage device 106, which may operate as a storage array. For instance, the storage system 100 may include a plurality of storage devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the storage device 106. As illustrated in FIG. 1, the host device 104 may communicate with the storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The storage device 106 includes a controller 108, NVM 110, a power supply 111, a first random-access memory (RAM) or volatile memory 112, such as a dynamic random-access memory (DRAM), and an interface 114. The controller 108 may comprise a parity engine or a XOR engine 124 and a second RAM or volatile memory 118, such as a static random-access memory (SRAM). The XOR engine 124 is a type of parity engine and is called out as a XOR engine for exemplary purposes. However, the XOR engine 124 may include other embodiments that the parity engine comprises. In the following descriptions, a first RAM or volatile memory 112 is referenced to as DRAM and a second RAM or volatile memory 118 is referenced as SRAM for simplification and exemplary purposes. In some examples, the storage device 106 may include additional components not shown in FIG. 1 for sake of clarity. For example, the storage device 106 may include a printed circuit board (PCB) to which components of the storage device 106 are mechanically attached and which includes electrically conductive traces that electrically interconnect components of the storage device 106, or the like. In some examples, the physical dimensions and connector configurations of the storage device 106 may conform to one or more standard form factors. Some example standard form factors include, but are not limited to, 2.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the storage device 106 may be directly coupled (e.g., directly soldered) to a motherboard of the host device 104.

The interface 114 of the storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, PCIe, non-volatile memory express (NVMe), OpenCAPI, GenZ, Cache Coherent Interface Accelerator (CCIX), Compute Express Link (CXL), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the storage device 106 to receive power from the host device 104. For example, as illustrated in FIG. 1, the power supply 111 may receive power from the host device 104 via the interface 114.

The storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

A portion of the NVM 110 may be formatted into logical blocks such that a capacity of the NVM 110 is divided into a plurality of streams. Each of the streams comprise a plurality of physical or erase blocks of the NVM 110, and each of the erase blocks are associated a plurality of logical blocks. Each of the logical blocks is associated with a unique LBA or sector. Each of the streams may have a size aligned to the capacity of one or more erase blocks of the NVM 110. When the controller 108 receives a command, such as from a host device 104, the controller 108 can read data from and write data to the plurality of logical blocks associated with the plurality of erase blocks of the NVM 110.

The storage device 106 includes a power supply 111, which may provide power to one or more components of the storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, RAM, DRAM, SRAM, and synchronous dynamic RAM (SDRAM (e.g., DDR1, DDR2, DDR3, DDR3L, LPDDR3, DDR4, LPDDR4, DDR5, LPDDR5, and the like)). As illustrated in FIG. 1, volatile memory may consume power received from the power supply 111.

The various types of volatile memories may be used with different access properties. For example, DRAM 112 may be arranged for longer burst accesses to allow for improved bandwidth (BW) of the same access bus. Alternatively, DRAM 112 may be used with smaller accesses such that random small accesses may have better latency. The controller 108 comprises additional optional SRAM and/or embedded MRAM 126. Embedded MRAM 126 is another alternative memory that may be used in another embodiment. Similarly, the access to the MRAM 126 can be optimized for different design purposes, but the quantity of embedded MRAM 126 in the SSD controller 108 may be cost sensitive. Therefore, the choice of how much data and which data goes into the premium non-volatile memory and premium volatile memory will subject to system tradeoffs.

The storage device 106 includes a controller 108, which may manage one or more operations of the storage device 106. For instance, the controller 108 may manage the reading of data from and/or the writing of data to the NVM 110 via a toggle mode (TM) bus 128. In some embodiments, when the storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the storage device 106 receives a write command from the host device 104, the controller 108 temporarily stores the data associated with the write command in the internal memory or buffer (not shown) before sending the data to the NVM 110.

The controller 108 may include a XOR engine 124 with logic and/or features to generate XOR parity information. Exclusive OR (XOR) parity information may be used to improve reliability of storage device 106, such as enabling data recovery of failed writes or failed reads of data to and from NVM or enabling data recovery in case of power loss. The reliability may be provided by using XOR parity information generated or computed based on data stored to storage device 106. Data may pass through the XOR engine 124 to be written to the NVM 110. The XOR engine 124 may generate a parity stream to be written to the SRAM 118. The SRAM 118 and the DRAM 112 may each contain a plurality of regions which data may be written to. Data associated with a stream may be copied from an SRAM region 122a-122n in the SRAM 118 to a DRAM region 116a-116n in the DRAM 112, and vice-versa.

The SRAM 118 and the DRAM 112 each individually comprises one or more dies. Each of the one or more dies comprises one or more ranks which is comprised of one or more banks. The banks are composed of rows and pages. The SRAM 118 in the controller 108 may be logically or physical separated into different SRAM areas or regions 122a-122n for use by the controller 108. Similarly, the DRAM 112 may be logically or physical separated into different DRAM areas or regions 116a-116n for use by the controller 108. The MRAM inside of the controller 108 may be logically or physical separated into different MRAM areas or regions (not shown). External attachments of MRAM often have a vendor specific structure and access not covered here.

Figure 2:
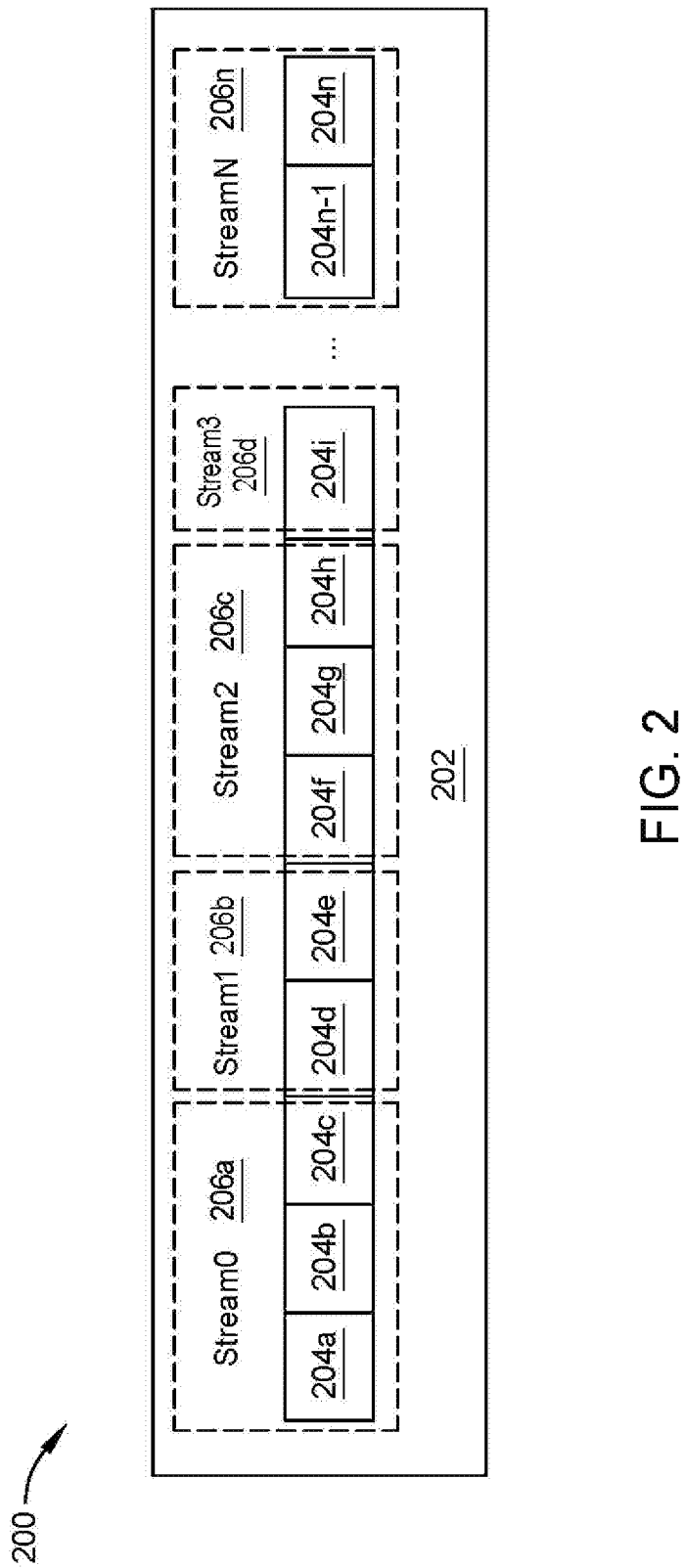
FIG. 2 illustrates a non-volatile storage unit comprised of a plurality of dies, according to one embodiment.

FIG. 2 illustrates of a storage device 200 including a non-volatile storage unit 202 comprising a plurality of dies 204a-204n, according to one embodiment. In the following descriptions, the non-volatile storage unit 202 is referred to as a NVM for simplification and exemplary purposes. The NVM 202 may be the NVM 110 of FIG. 1.

In one embodiment, the NVM 202 is a NAND device. The NAND device comprises one or more dies. Each of the one or more dies comprises one or more planes. Each of the one or more planes comprises one or more erase blocks. Each of the one or more erase blocks comprises one or more wordlines (e.g., 256 wordlines). Each of the one or more wordlines may be addressed in one or more pages. For example, an MLC NAND die may use upper page and lower page to reach the two bits in each cell of the full wordline (e.g., 16 kB per page). Furthermore, each page can be accessed at a granularity equal to or smaller than the full page. A controller can frequently access NAND in user data granularity LBA sizes of 512 bytes. Thus, as referred to in the below description, NAND locations are equal to a granularity of 512 bytes. As such, an LBA size of 512 bytes and a page size of 16 KiB for two pages of an MLC NAND results in 32 LBAs per wordline. However, the NAND location size is not intended to be limiting, and is merely used as an example.

The capacity of the NVM 202 is divided into a plurality of streams 206a-206n (collectively referred to as streams 206), and each of the streams 206 comprises a plurality of dies 204. The NVM 202 of the storage device can be formatted into logical blocks such that the capacity is divided into a plurality of streams 206. Each of the plurality of streams 206 may have a state that is open and active, open and closed, empty, full, or offline. An empty stream switches to an open and active stream once a write is scheduled to the stream or if the stream open command is issued by the host. The controller can move a stream between stream open and stream closed states, which are both active states. If a stream is active, the stream comprises open blocks that may be written to, and the host may be provided a description of recommended time in the active state.

The term "written to" includes programming user data on 0 or more NAND locations in an erase block and/or partially filled NAND locations in an erase block when user data has not filled all of the available NAND locations. The term "written to" may further include moving a stream to full due to internal drive handling needs (open block data retention concerns because the bits in error accumulate more quickly on open erase blocks), the storage device closing or filling a stream due to resource constraints, like too many open streams to track or discovered defect state, among others, or a host device closing the stream for concerns such as there being no more data to send the drive, computer shutdown, error handling on the host, limited host resources for tracking, among others.

The active streams may be either open or closed. An open stream is an empty or partially full stream that is ready to be written to and has resources currently allocated. The data received from the host device with a write command may be programmed to an open erase block that is not currently filled with prior data. A closed stream is an empty or partially full stream that is not currently receiving writes from the host in an ongoing basis. The closed state is a resource conserved lower performance internal state. The movement of a stream from an open state to a closed or resource conserved lower performance internal state allows the controller to reallocate resources to other tasks. These tasks may include, but are not limited to, other streams that are open, other conventional non-stream regions, or other controller needs.

Each of the streams 206 comprise a plurality of physical or erase blocks (not shown) of a memory unit or NVM 202, and each of the erase blocks are associated a plurality of logical blocks (not shown). Each of the streams 206 may be a different size, and are not required to be aligned to the capacity of one or more erase blocks of a NVM or NAND device. A stream write size (SWS) is an optimal write size agreed on between the host, such as the host 104 of FIG. 1, and the storage device, such as the storage device 106 of FIG. 1. The SWS may be a factory setting of the storage device 200. Write sizes received in sizes less than the SWS may still be written to the relevant stream; however, the write performance may be limited.

When the controller receives a command, such as from a host device (not shown) or the submission queue of a host device, the command is received with a stream ID (e.g., stream0), which tells the controller which stream 206 of the plurality of streams 206 to write the data associated with the command to. The host device may select the stream ID for a command based on data the host device wants grouped together. Thus, the data stored within each stream 206 may be related or grouped together as determined by the host, such as the host 104 of FIG. 1.

Because the host is not restricted to any size granularity, the controller, such as the controller 108 of FIG. 1, in the SSD must be prepared to grow or shrink the erase blocks (EBs). The SSD controller will select a granularity of one or more EBs. The controller will add units of the granularity of one or more EBs to the stream as more physical capacity is required by the streams. If data is unmapped, deallocated, or trimmed, the controller may choose to erase EBs and return them to the free pool of available EBs for the addition to a stream needing capacity. Further, there may be occasions where stream data is overwritten. Thus, the controller may execute garbage collection within one stream or among several streams concurrently to compact the physical space and reclaim EBs when the free pool is low.

In FIG. 2, each die is composed of two planes (not shown), and each plane comprises a plurality of erase blocks (not shown). User data may be stored in any die 204a-204n-1 of the NVM 202. At least one die 204n may be dedicated to storing the data in flight, such as unwritten user data received from the host or XOR data or parity data associated with the user data. Unwritten user data may comprise small lengths or amount of data (e.g., less than the size of one or more wordlines) that are stored in a parking location or buffer, such as a region in the SRAM 118 (shown in FIGS. 3A-3D, for example), until the aggregated size of the data reaches a minimum size (e.g., the size of one or more wordlines), in which case the unwritten user data is written to the NVM 202. In one embodiment, data in flight may be stored in more than one die 204a-204n. Data in flight may be stored in any of the dies 204a-204n within the NVM 202, and is not limited to being stored in the last die 204n.

The parity data, deemed as data in flight, is considered the parity buffer and may protect the loss of data due to data corruption, erroneous bit transfer, power loss, and other causes of data loss. The parity data may be generated or updated in the SRAM, and temporarily stored in the SRAM and/or DRAM before being copied to the NVM 202, for example. Furthermore, in case of power failure, capacitors (not shown) located within the storage device, such as the storage device 106 of FIG. 1, may store an adequate amount of energy to program data from the DRAM, such as the DRAM 112 of FIG. 1, to the NVM 202 to help prevent data loss, for example.

FIGS. 3A-3D illustrate a schematic block diagram of generating and/or updating data corresponding to various streams in the volatile memory, according to various embodiments. Aspects of the system 100 of FIG. 1 will be used in accordance with FIG. 3A-3D. In the following descriptions, a non-volatile storage unit 110 is referred to as a NVM, a first RAM or volatile memory 112 (i.e., a first RAM1) is referred to as DRAM, and a second RAM or volatile memory 118 (i.e., a second RAM2) is referred to as SRAM for simplification and exemplary purposes.

The data storage device 300 may be the storage device 106 described in FIG. 1 or the storage device 200 of FIG. 2, and the non-volatile memory (NVM) 306 may be the non-volatile memory 110 described in system 100 of FIG. 1 or the NVM 202 of FIG. 2. Terminology such as NAND may be utilized throughout to describe the non-volatile memory 110. Such terminology is not meant to be limiting, but to provide an example of a possible embodiment of the reference. The controller 302 may be the controller 108 described in system 100 of FIG. 1, the XOR engine 304 may be the XOR engine 124 described in system 100 of FIG. 1, the SRAM 308 may be the SRAM 118 described in system 100 of FIG. 1, and the DRAM 312 may be the DRAM 112 of FIG. 1.

The phrase "parity data" is utilized throughout as an example of data in flight, and is not intended to be limiting, as other forms of data in flight may be relevant. In other words, the parity data discussed in the examples below is data in flight and may include unwritten host data. Unwritten user or host data may comprise small lengths or amount of data (e.g., less than the size of one or more wordlines) that are stored in a parking location or buffer, such as the SRAM region 310m, until the aggregated size of the data reaches a minimum size (e.g., the size of one or more wordlines), in which case the unwritten user data is written to the NVM 110.

In FIGS. 3A-3D, streams are denoted by "Wxx" where "x" represents a stream ID. The use of "Wxx" to define a stream ID in a SRAM region 310a-310n signifies that a controller 302 has received a write command to write data to a stream and will update parity data for the corresponding stream. However, the use of "Wxx" to define a stream ID in a DRAM region 314a-314n signifies that the parity data has been successfully updated in a SRAM region 310a-310n and written from the relevant SRAM region 310a-310n to a DRAM region 314a-314n. A SRAM region 310a-310n and a DRAM region 314a-314n may by any suitable size related to a stream, as described above.

Furthermore, in the embodiments discussed below, the SRAM 308 may comprise some amount of space dedicated as a temporary buffer or "scratch pad" for the parity data of a stream associated with a write command. The temporary buffer may comprise about one SRAM region 310n to about five SRAM regions 310n-4-310n, or more than five SRAM regions 310n-4-310n in some embodiments. Data stored in a temporary SRAM region 310n-4-310n may be stored for short periods of time. The SRAM 308 further comprises a plurality of non-temporary SRAM regions 310a-310f where data may be stored for long periods of time. The listed number of SRAM regions 310a-310n, both temporary and non-temporary, is not intended to be limiting, but to provide examples of possible embodiments.

Parity data for streams may be further denoted by an asterisk (*) or a single quotation or prime park ('). An asterisk (*) signifies that the new parity data for a stream has been programmed from the XOR engine 304 to the temporary buffer in the SRAM 118, but has not yet updated a SRAM region 310a-310n storing related parity data for the stream copied from a DRAM region 314a-314n. A single quotation or prime mark (') refers to a stream comprising an updated parity data associated with a write command to the temporary buffer of the SRAM 308.

The data storage device 300 may restrict or limit the host, such as the host device 104 of FIG. 1, to a maximum number of concurrent streams in the open and active state. The storage device 300 and the host device may have a verbal agreement or a "handshake agreement" (i.e., a factory setting) for a maximum number of concurrent streams in the open and active state. For example, the maximum number of streams in the open active state may be restricted to about 8 streams to about 256 streams. An active stream refers to a stream that is available for data to be written to or copied from. An open state describes a stream that is receiving write commands, whereas a closed state or resource conserved lower performance internal state describes a stream that is not currently receiving write commands.

After a predetermined amount of time has expired since last switching the state of a stream, such as about 0.5 seconds to about 1 second, 1 second to about 5 seconds, or about 0.5 seconds to about 5 seconds, the controller 302 allows the host to send a write command to write data to a closed stream. The controller 302 then switches the identified closed stream to the open and active state, and switches the least recently used open stream to the closed state (e.g., the stream that has not received a write command in the longest amount of time). Thus, the maximum number of concurrent streams in the open and active state is not exceeded. The predetermined amount of time and the maximum number of streams in the open and active state listed above are not intended to be limiting, but to provide examples of possible embodiments.

Furthermore, switching between an open state and a closed or resource conserved lower performance internal state for a stream occurs through an agreement between the host, such as a host 104 of FIG. 1, and the storage device 300. The maximum number of open state and active streams of the NVM 306 may equal the number of SRAM 308 temporary buffer locations. The controller 302 may swap an active and open stream to a closed stream if a write command is received that interrupts or has higher priority than the current write command associated with the open stream, or if the predetermined amount of time has expired or passed.

Generally, as discussed further below, a command to write data to a stream is received by the controller 302, the XOR engine 304 generates parity data for the command in a temporary SRAM region 310a-310n. Simultaneously, if previous parity data for the stream exists in the DRAM 312, the previous parity data is copied to a SRAM region 310a-310f (e.g., a non-temporary SRAM region where data may be stored long-term). Once the previous parity data is in a SRAM region 310a-310f, the previous parity data is updated with the new parity data stored in the temporary SRAM region 310n-4-310n. The updated parity data is then copied from the SRAM 308 to a DRAM region 314a-314n.

The data transfer speed from a DRAM region 314a-314n to a SRAM region 310a-310n may be slower than the XOR engine 304 write speed to the temporary buffer of the SRAM 308, or vice-versa. The amount of time to generate new parity data for a write command in the temporary buffer location of the SRAM 308, to copy the previous parity data from the DRAM 312 to the SRAM 308, to update the previous parity data with the new parity data in the SRAM 308, and to switch a stream from the open and active state to the closed or resource conserved lower performance internal state, as well as the amount of space in the temporary buffer, collectively determines the maximum number of open and active streams. Thus, the amount of time to generate new parity data for a write command in the temporary buffer location of the SRAM 308, to copy the previous parity data from the DRAM 312 to the SRAM 308, and/or to update the previous parity data with the new parity data in the SRAM 308 may be rate matched to the amount of time it takes to switch a stream from the open and active state to the closed or resource conserved lower performance internal state. In the embodiments herein, the temporary buffer is comprised of five SRAM regions 310n-4-310n and the maximum number of open state and active streams is five streams.

Figure 3A:
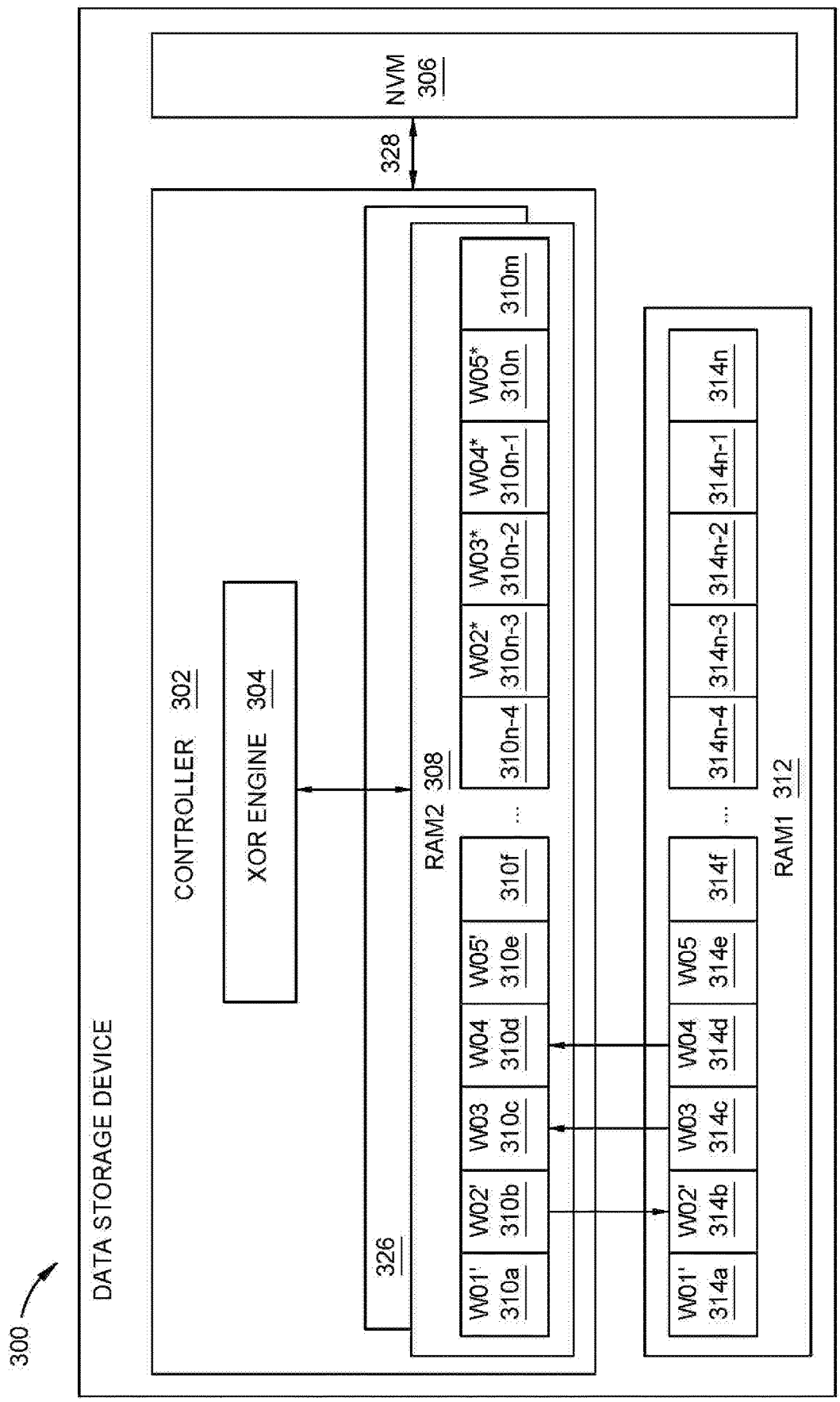
FIGS. 3A-3D illustrate a schematic block diagram of generating and/or updating data corresponding to various streams and various streams in the volatile memory, according to various embodiments.

As shown in FIG. 3A, new parity data for a second stream W02* and a fifth stream W05* was written to a second temporary SRAM region 310n-3 and a fifth temporary SRAM region 310n, respectively, upon receiving one or more commands to write data to the second and fifth streams. FIG. 3A further illustrates the updated parity or parity data for the second stream W02' being stored in both the SRAM 308 and the DRAM 312. In other words, the previous parity data for the second stream was updated with the new parity data for the second stream W02* in the SRAM 308 and copied to the DRAM 312 as updated second parity or parity data W02'. Upon updating previous parity data for stream, the new parity data for the stream may be erased from the temporary SRAM region. Thus, updated parity or parity data for a first stream W01' is stored in a first SRAM region 310a and in the DRAM 312; however, the corresponding new parity data for the first stream has been erased from the temporary SRAM regions (e.g., a first temporary SRAM region 310n-4).

When a first write command to write data to a third stream is received by the controller 302, the XOR engine 304 writes new parity data associated with the third stream W03* for the first write command to a third temporary SRAM region 310n-2, or the first temporary buffer location available. The controller 302 simultaneously copies the previous parity data for the third stream W03 from a DRAM region 314c to an available SRAM region 310c, as shown by the arrow between 314c and 310c in FIG. 3A.

When a second write command to write data to a fourth stream is received by the controller 302, the XOR engine 304 writes new parity data associated with the fourth stream W04* for the second write command to a fourth SRAM region 310n-1, or the first temporary buffer location available. The controller 302 simultaneously copies the previous parity data for the fourth stream W04 from a DRAM region 314d to an available SRAM region 310d, as shown by the arrow between 314d and 310d in FIG. 3A. Thus, as shown in FIG. 3A, the first through fifth streams are currently in the open and active state. The host may send as many commands to write data to the first through fifth streams as the host wants however quickly and in whatever order the host wants, as the first through fifth streams are all currently in the open and active state.

Figure 3B:
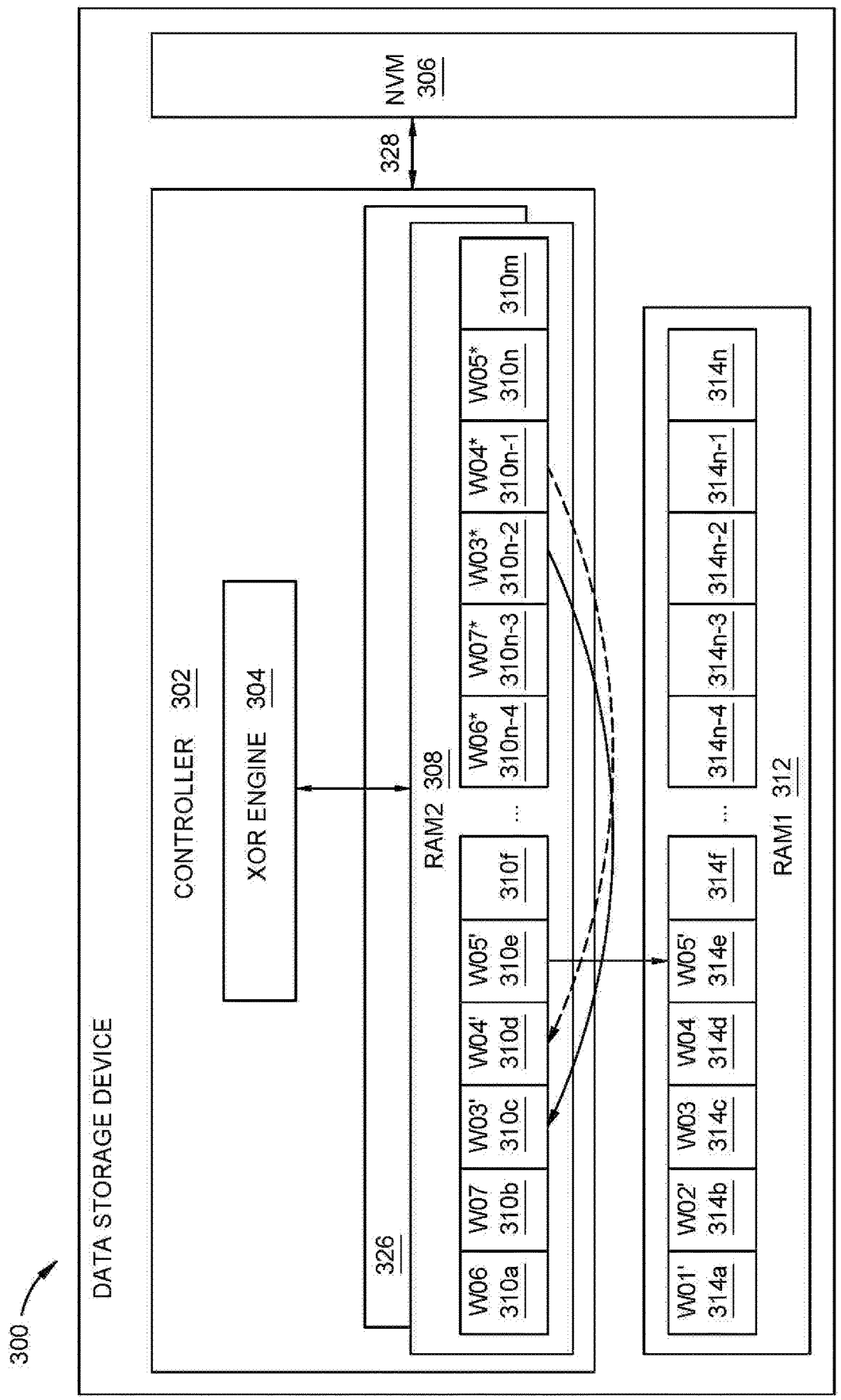

In FIG. 3B, the previous parity data associated with the third stream W03 is updated with the new parity associated with the third stream W03* to updated third parity data W03' in a third SRAM region 310c. Upon updating the previous parity data for the third stream W03' with the new parity data for the first write command, the new parity data associated with the third stream W03* for the first command may be erased from the third temporary SRAM region 310n-2. Previous parity data for a stream may be updated in any SRAM region 310a-310n.

The previous parity data associated with the fourth stream W04 is updated with the new parity associated with the fourth stream W04* to updated fourth parity data W04' in a fourth SRAM region 310d. Upon updating the previous parity data for the fourth stream W04' with the new parity data for the second write command, the new parity data associated with the fourth stream W04* for the second command may be erased from the fourth temporary SRAM region 310n-1, or the first temporary buffer location available. Simultaneously, updated parity data associated with the fifth stream W05' stored in a fifth SRAM region 310e is copied to a fifth DRAM region 314e as fifth updated parity data W05'.

A third write command to write data to a closed sixth stream is then received by the controller 302. Since the maximum number of open state and active streams is currently met (i.e., the first through fifth streams), the controller 302 closes the first stream due to the first stream being the least recently used stream, the third write command to write to a closed stream being received, and the predetermined amount of time expiring since last switching the state of a stream. Upon closing the first stream (i.e., switching the first stream to a resource conserved lower performance internal state), the parity data associated with the first stream may be erased from the SRAM 308. The XOR engine 304 generates parity data associated with the sixth stream W06* for the third command and writes the generated parity data associated with the sixth stream W06* to a first temporary SRAM region 310n-4, or the first temporary buffer location available. If previous parity data associated with the sixth stream is stored in the DRAM 312, the previous parity data associated with the sixth stream is then copied from the DRAM 312 to the SRAM 308.

A fourth write command to write data to a closed seventh stream is received by the controller 302 may be held in a buffer (not shown) within the controller 302 until a temporary SRAM region 310n-4-310n is available, if parity data stored in the temporary SRAM regions 310n-4-310n has not yet been erased. The controller switches the least recently used stream, which is the second stream, from the open and active state to the closed or resource conserved lower performance internal state after the predetermined amount of time of about 0.5 seconds to about 5 seconds has passed, and switches the seventh stream to the open and active state. Upon closing the second stream, the parity data associated with the second stream may be erased from the SRAM 308. New parity data associated with the seventh stream W07* for the fourth command is generated by the XOR engine 304 and is written to the second temporary SRAM region 310n-3. If previous parity data associated with the seventh stream is stored in the DRAM 312, the previous parity data associated with the seventh stream is then copied from the DRAM 312 to the SRAM 308.

Thus, as shown in FIG. 3B, the third through seventh streams are currently in the open and active state. The host may send as many commands to write data to the third through seventh streams as the host wants however quickly and in whatever order the host wants, as the third through seventh streams are all currently in the open and active state.

Figure 3C:
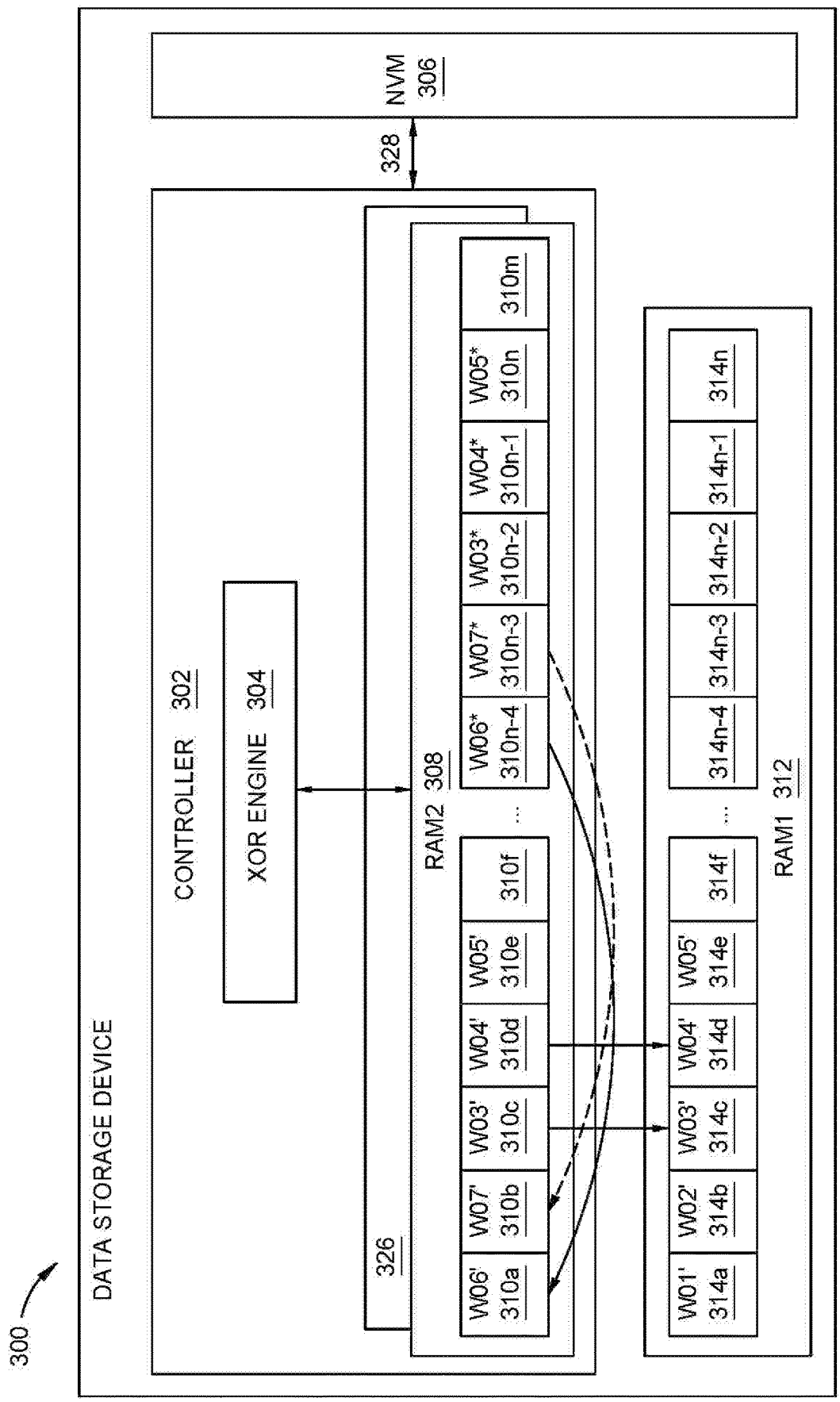

In FIG. 3C, the updated parity data associated with the third stream W03' and the updated parity data associated with the fourth stream W04' are copied from the SRAM 308 to the DRAM 312. The previous parity data associated with the sixth stream W06 is updated with the corresponding new parity data W06* as updated sixth parity data W06' in the first SRAM region 310a. Upon updating the previous parity data for the sixth stream W06' with the new parity data for the third write command, the new parity data associated with the sixth stream W06* for the third command may be erased from the first temporary SRAM region 310n-4.

The previous parity data associated with the seventh stream W07 is updated with the corresponding new parity data W07* as updated seventh parity data W07' in the second SRAM region 310b. Upon updating the previous parity data for the seventh stream W07' with the new parity data for the fourth write command, the new parity data associated with the seventh stream W07* for the fourth command may be erased from the second temporary SRAM region 310n-3. If previous parity data does not yet exist for the sixth or seventh stream, the new parity data associated with the sixth stream W06* or the new parity data associated with the seventh stream W07* may be moved to any non-temporary SRAM region (e.g., SRAM regions 310a-310f).

Figure 3D:
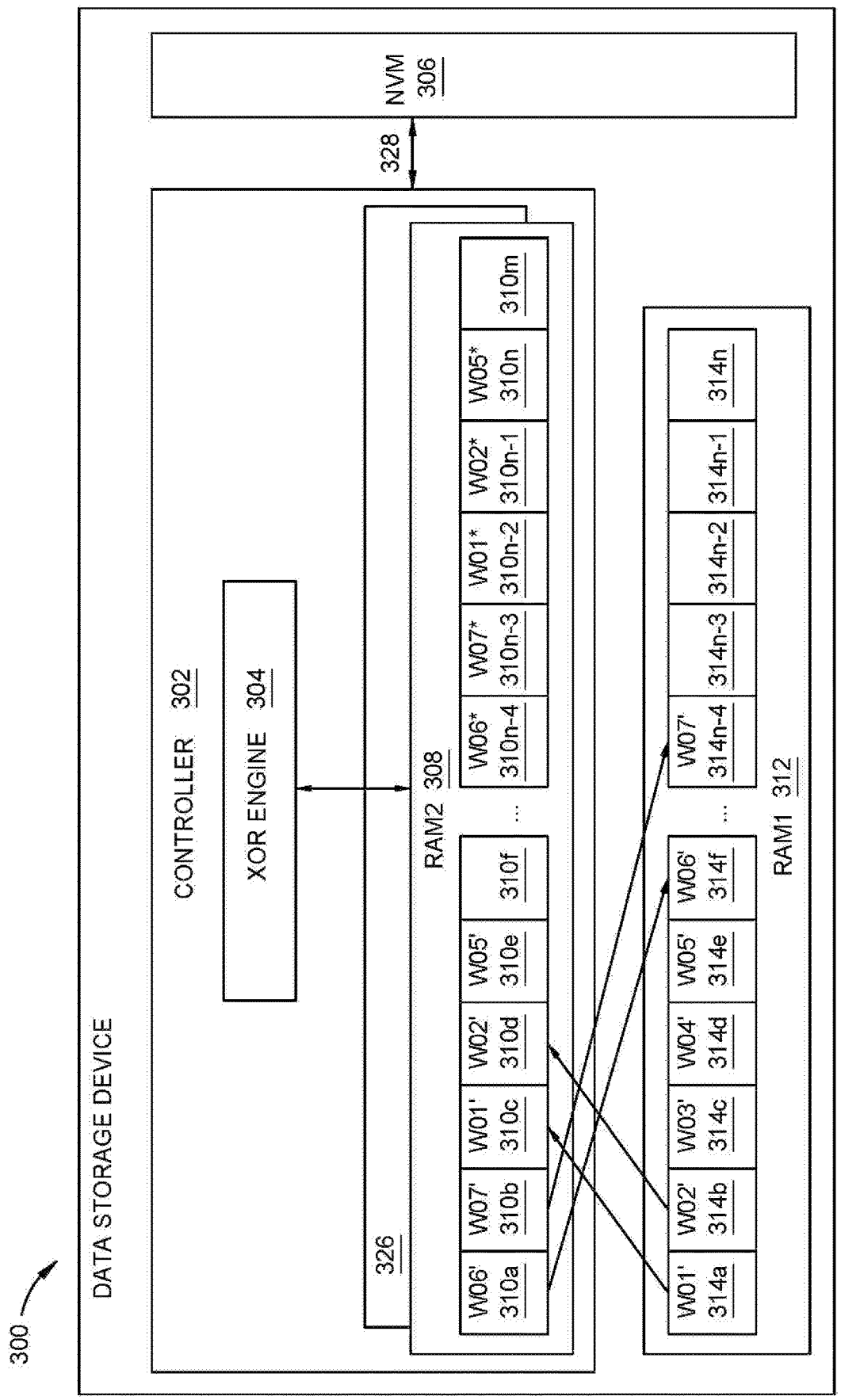

In FIG. 3D, a fifth write command to write data to the first stream is received by the controller 302. Since the first stream was previously switched to the closed or resource conserved lower performance internal state, the controller 302 switches the least recently used stream that is currently in the open and active state to the closed or resource conserved lower performance internal state, which is the third stream, upon the predetermined amount of time passing since last switching the state of a stream. The controller 302 then switches the first stream from the closed or resource conserved lower performance internal state to the open and active state. The XOR engine 304 generates new parity data associated with the first stream W01* for the fifth write command and writes the new parity data to the third SRAM region 310n-2, or the first temporary buffer location available. Simultaneously, the previous parity data associated with the first stream W01' is copied from the DRAM 312 to the third SRAM region 310c.

A sixth write command to write data to the second stream is received by the controller 302. Since the second stream was previously switched to the closed or resource conserved lower performance internal state, the controller 302 switches the least recently used stream that is currently in the open and active state to the closed or resource conserved lower performance internal state, which is the fourth stream, upon the predetermined amount of time passing since last switching the state of a stream. The controller 302 then switches the second stream from the closed or resource conserved lower performance internal state to the open and active state.

If the predetermined amount of time has not yet expired since switching the third stream to the closed or resource conserved lower performance internal state and switching the first stream to the open and active state, the controller 302 will wait until the predetermine amount of time has passed or expired before closing the fourth stream and re-opening the second stream. The XOR engine 304 generates new parity data associated with the second stream W02* for the sixth command and writes the new parity data to the fourth temporary SRAM region 310n-1, or the first temporary buffer location available. Simultaneously, the previous parity data associated with the second stream W02' is copied from the DRAM 312 to the fourth SRAM region 310d.

Thus, when a new write command is received to write data to a previously closed stream, the controller 302 opens the stream so that the new write command can be written to the stream. However, if the maximum number of open and active streams has been reached, the controller 302 waits until the predetermined amount of time has passed before changing the least recently used stream to the closed or resource conserved lower performance internal state. After changing the least recently used stream to the closed or resource conserved lower performance internal state, the controller 302 may then change the relevant stream to the open and active state. The maximum number of open and active streams is selected to minimize any write delays, as copying data to and from the SRAM 308 to the DRAM 312 takes time.

The updated parity data associated with the sixth stream W06' is copied to an available DRAM region, such as a sixth DRAM region 314f. The updated parity data associated with the seventh stream W07' is copied to an available DRAM region, such as DRAM region 314n-4. Thus, as shown in FIG. 3D, the first, second, fifth, sixth, and seventh streams are currently in the open and active state. The host may send as many commands to write data to the first, second, fifth, sixth, and seventh streams as the host wants however quickly and in whatever order the host wants, as the first, second, fifth, sixth, and seventh streams are all currently in the open and active state.

Figure 4:
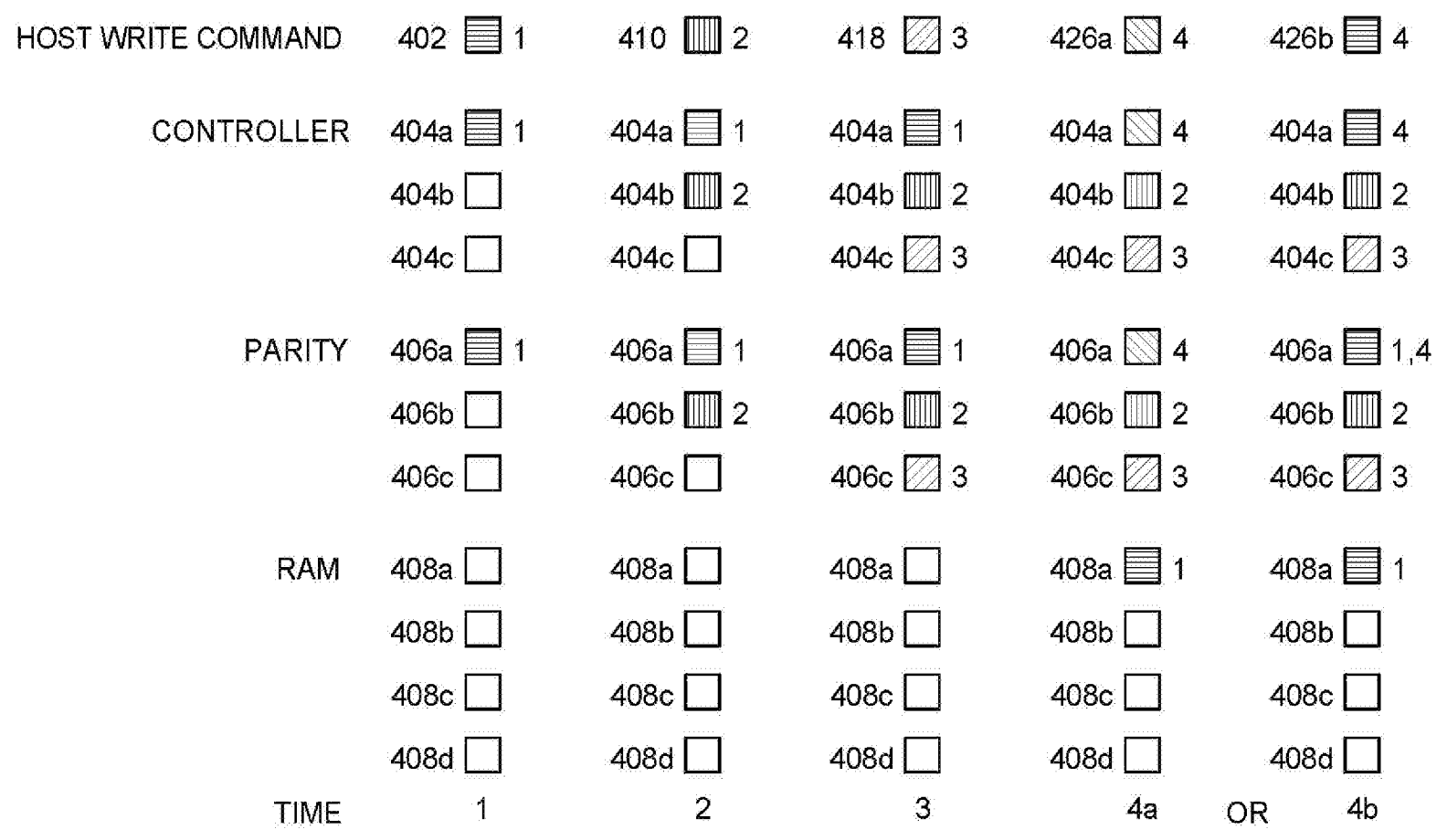

FIG. 4 illustrates a schematic diagram 400 of updating data in flight, such as parity data, over time in the storage device, according to one embodiment. The storage device of FIG. 4 may be the storage device 106 of FIG. 1. Like in the above examples, parity data will be used as an example of data in flight. The times used below are representative, and may occur in a matter of seconds or minutes. A write command to a first stream is illustrated as a horizontal striped block, a write command to a second stream is illustrated as a vertical striped block, a write command to a third stream is illustrated as a upward diagonal striped block, and a write command to a fourth stream is illustrated as a downward diagonal striped block. For example, a first write command 434 is to write data to a first stream, a second write command 442 is to write data to a second stream, and a third write command 450 is to write data to a third stream. The fourth write command 450a is to write data to a fourth stream and the fourth write command 450b is to a first stream.

In the current embodiment, the controller includes three available controller RAM or buffer regions 404a, 404b, 404c for storing host write commands and three available parity RAM or buffer regions 406a, 406b, 406c for storing parity data. The controller buffer regions 404a, 404b, 404c and the parity buffer regions 406a, 406b, 406c may be any SRAM regions of 122a-122n of FIG. 1. The controller buffer regions 404a, 404b, 404c store data not yet written to the NVM. The storage device also includes four available RAM regions 408a, 408b, 408c, 408d for parity data storage, in which each region corresponds to a stream, such that a first RAM region 408a corresponds to a first stream, a second RAM region 408b corresponds to a second stream, a third RAM region 408c corresponds to a third stream, and a fourth RAM region 408d corresponds to a fourth stream. The number of regions listed for each component above is not intended to be limiting, but to provide an example of a possible embodiment.

At time 1, the controller receives a first host write command 402 to write data to a first stream. The first host write command 402 is stored temporarily in a first controller buffer region 404a. Before or while the data of the first host write command 402 for the first stream is written to the NVM, the XOR engine 124 generates first parity data in a parity buffer region 406a for the first host write command 402 for the first stream.

At time 2, the controller receives a second host write command 410 to write data to a second stream. The second host write command 410 is stored temporarily in a second controller buffer region 404b. Before or while the data of the second host write command 410 for the second stream is written to the NVM, the XOR engine 124 generates second parity data in a parity buffer region 406b for the second host write command 410 for the second stream.

At time 3, the controller receives a third host write command 418 to write data to a third stream. The third host write command 418 is stored temporarily in a third controller buffer region 404c. Before or while the data of the third host write command 418 for the third stream is written to the NVM, the XOR engine 124 generates third parity data for the third host write command 418 for the third stream in the parity buffer region 406c.

At time 4a, the controller receives a fourth host write command 426a to write data to a fourth stream. The data of the fourth host write command 426a is written to the first controller buffer region 404a. Throughout times 1-3, a previous write command, such as the first host write command 402, stored in the first controller buffer region 404a has been successfully written to the NVM, and the data in the first controller buffer region 404a can be overwritten with the data of a new host write command data, such as the fourth host write command 426a. The first parity data for the first host write command 402 is then written to the RAM region 408a, and the XOR engine 124 generates fourth parity data for the fourth host write command 426a in the parity buffer region 406a. If a fifth host write command is received to write data to the first stream, the first parity data will be copied from the RAM region 408a back to a parity buffer region 406a-406c.

However, if the controller receives a fourth host write command to a stream that has previously been written to, such as a fourth host write command 426b to write data to the first stream, at time 4b, the data of the fourth host write command 426b is written to the first controller buffer region 404a. Throughout times 1-3, the data previously stored in the first controller buffer region 404a (e.g., the first host write command 402) has been successfully written to the NVM. However, if the data of the previous write command is still being written to the NVM, the fourth host write command 426b is temporarily held in a controller buffer (e.g., a temporary SRAM region 310n-4-310n) until the transfer to the NVM has completed. The XOR engine 124 then generates fourth parity data for the fourth host write command 426b in the parity buffer region 406a. The parity buffer region 406a thus includes both first parity data for the first host write command 402 and fourth parity data for the fourth host write command 426b.

During time 4b, since the parity buffer region 406a is still storing the first parity data for the first host write command 402 to the first stream, the controller is able to update the parity data of the first stream to include the parity data of the fourth host write command 426b without delay, unlike during time 4a. Moreover, by waiting until a next host write command is received before copying data from the parity buffers to the RAM regions, data may be copied to and from the parity buffer regions to the RAM regions fewer times. Since transferring data to and from the parity buffer regions to the RAM regions takes time, waiting to copy data from the parity buffer regions to the RAM regions allows the storage device to operate in a quicker and more efficient manner.

By setting a maximum number of open and active streams based on the amount of time it takes to copy the relevant data to and from a DRAM region to a SRAM region, write the parity data associated with a stream for the write command to a temporary buffer location in the SRAM, and update the previous parity data associated with a stream, the efficiency of the memory device may be increased. The maximum number of open and active streams is selected to minimize any write delays, as the host may send unlimited write commands to write data to open and active streams without delay. Since SRAM is fast but more expensive, and DRAM is slower but cheaper, the DRAM and SRAM usages are both better optimized, reducing any DRAM access penalties.

Therefore, by basing the maximum number of open streams on one or more of the amount of time to generate new parity data for a write command in a temporary buffer location of the SRAM, the amount of time to copy the previous parity data from the DRAM to the SRAM, the amount of time to update the previous parity data with the new parity data in the SRAM, the amount of time to switch a stream from the open and active state to the closed or resource conserved lower performance internal state, and the amount of space in the temporary buffer, the storage device can operate in the quickest, smoothest, and most efficient manner. Furthermore, by restricting the host from opening new streams only after the predetermined amount of time has passed, the storage device has enough time to copy data to and from the DRAM to the SRAM, further eliminating delays for write commands.

In one embodiment, a storage device comprises a non-volatile storage unit, wherein the capacity of the non-volatile storage unit is divided into a plurality of streams. The non-volatile storage unit comprises a plurality of dies and each of the plurality of dies comprising a plurality of erase blocks. The storage device further comprises a first volatile memory unit and a controller coupled to the non-volatile storage unit and the first volatile memory unit. The controller comprises a second volatile memory unit, wherein the controller is configured to set a maximum number of open and active streams and receive one or more first commands to write data to one or more open and active streams of the plurality of streams. The controller is further configured to receive one or more second commands to write data to a first stream, wherein the first stream is in a closed or resource conserved lower performance internal state, change a least recently used open and active stream to the closed or resource conserved lower performance internal state, and change the first stream to an open and active state.

The controller is further configured to determine which open and active stream was least recently used prior to changing the least recently used open and active stream to the closed or resource conserved lower performance internal state. The maximum number of open and active streams is determined based on an amount of time it takes to change the least recently used stream to the closed or resource conserved lower performance internal state and to change the first stream to an open and active state. The controller is further configured to change the least recently used stream to the closed or resource conserved lower performance internal state and to change the first stream to an open and active state after a predetermined amount of time has expired. The second volatile memory is a SRAM unit and the first volatile memory is a DRAM unit, and wherein the SRAM unit comprises one or more temporary locations for generating new parity data for the one or more first commands received and the one or more second commands received. The maximum number of open and active streams is determined based on a number of temporary locations in the SRAM unit. The controller is further configured to generate new first parity data for the first stream in a first temporary location in the SRAM unit, copy previous first parity data for the first open and active stream from the DRAM unit to a first location in the SRAM unit while generating the new first parity data, update the previous first parity data with the new first parity data in the SRAM unit, and copy the updated first parity data from the SRAM unit to the DRAM unit when a controller buffer area of the SRAM unit is filled to capacity, the controller buffer area temporarily storing data to be written to the non-volatile storage unit. The maximum number of open and active streams is further determined based on an amount of time the generating the new first parity data, copying the previous first parity data, and updating the previous first parity data takes.

In another embodiment, a storage device comprises a non-volatile storage unit, wherein the capacity of the non-volatile storage unit is divided into a plurality of streams. The non-volatile storage unit comprises a plurality of dies and each of the plurality of dies comprising a plurality of erase blocks. The storage device further comprises a first volatile memory unit and a controller coupled to the non-volatile storage unit and the first volatile memory unit. The controller comprises a second volatile memory unit, wherein the controller is configured to set a maximum number of open and active streams, receive one or more commands to write data to one or more open and active streams of the plurality of streams, and generate new first parity data for a first open and active stream in a temporary location of one or more temporary locations in the second volatile memory unit. The controller is further configured to copy previous first parity data for the first open and active stream from the first volatile memory unit to a first location in the second volatile memory unit. The controller is also configured to update the previous first parity data with the new first parity data in the second volatile memory unit, wherein an amount of time the generating the new first parity data, copying the previous first parity data, and updating the previous first parity data takes determines the maximum number of open and active streams.

The controller is further configured to determine the first open and active stream is a least recently used stream of the open and active streams upon receiving one or more second commands to write data to a second stream, the second stream being in a closed or resource conserved lower performance internal state, change the first open and active stream to the closed or resource conserved lower performance internal state, and change the second stream to an open and active state. The maximum number of open and active streams is determined based on an amount of time it takes to change the first stream to the closed or resource conserved lower performance internal state and to change the second stream to an open and active state. The controller is further configured to change the least recently used stream to the closed or resource conserved lower performance internal state only after a predetermined amount of time has expired. The controller comprises one or more controller buffer regions, and the one or more commands received to write data to the one or more open and active streams of the plurality of streams fill the one or more controller buffer regions to capacity. The maximum number of open and active streams is determined based on a number of temporary locations in the second volatile memory unit. The second volatile memory is a SRAM unit and the first volatile memory is a DRAM unit.

In another embodiment, a storage device comprises a non-volatile storage unit, wherein the capacity of the non-volatile storage unit is divided into a plurality of streams. The non-volatile storage unit comprises a plurality of dies and each of the plurality of dies comprising a plurality of erase blocks. The storage device further comprises a first volatile memory unit and a controller coupled to the non-volatile storage unit and the first volatile memory unit. The controller comprises a second volatile memory unit, wherein the second volatile memory comprises one or more temporary locations. The controller is configured to set a maximum number of open and active streams, wherein the maximum number of open and active streams is determined based on a number of temporary locations in the second volatile memory and receive one or more first commands to write data to one or more open and active streams of the plurality of streams. The controller is further configured to generate new first parity data for a first open and active stream in a first temporary location in the second volatile memory unit, change a second open and active stream to a closed or resource conserved lower performance internal state upon receiving one or more second commands to write data to a closed stream, and change the closed stream to an open and active state.

The controller is further configured to copy previous first parity data for the first open and active stream from the first volatile memory unit to a first location in the second volatile memory unit while generating the new first parity data. The controller is also configured to update the previous first parity data with the new first parity data in the second volatile memory unit. The maximum number of open and active streams is further determined based on an amount of time the generating the new first parity data, copying the previous first parity data, and updating the previous first parity data takes, and an amount of time it takes to change the second open and active stream to the closed or resource conserved lower performance internal state and to change the closed stream to an open and active state. The controller is further configured to determine that the second open and active stream is the open and active stream that was least recently used. The controller is further configured to change an open and active stream to the closed or resource conserved lower performance internal state after a predetermined amount of time has expired, wherein the predetermined amount of time is about 0.5 seconds to about 5 seconds, and wherein the maximum number of open and active streams is further determined based on the predetermined amount of time.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
   a non-volatile storage unit, wherein a capacity of the non-volatile storage unit is divided into a plurality of streams, and wherein the non-volatile storage unit comprises a plurality of dies, each of the plurality of dies comprising a plurality of erase blocks;
   a first volatile memory unit; and
   a controller coupled to the non-volatile storage unit and the first volatile memory unit, the controller comprising a second volatile memory unit, wherein the controller is configured to:
   set a maximum number of open and active streams;
   receive one or more first commands to write data to one or more open and active streams of the plurality of streams;
   receive one or more second commands to write data to a first stream, wherein the first stream is in a closed or resource conserved lower performance internal state;
   change a least recently used open and active stream to the closed or resource conserved lower performance internal state, wherein the maximum number of open and active streams is determined based on an amount of time it takes to change the least recently used stream to the closed or resource conserved lower performance internal state and to change the first stream to an open and active state; and
   change the first stream to an open and active state.

2. The storage device of claim 1, wherein the controller is further configured to determine which open and active stream was least recently used prior to changing the least recently used open and active stream to the closed or resource conserved lower performance internal state.

3. The storage device of claim 1, wherein the controller is further configured to change the least recently used stream to the closed or resource conserved lower performance internal state and to change the first stream to an open and active state after a predetermined amount of time has expired.

4. The storage device of claim 1, wherein the second volatile memory is a SRAM unit and the first volatile memory is a DRAM unit, and wherein the SRAM unit comprises one or more temporary locations for generating new parity data for the one or more first commands received and the one or more second commands received.

5. The storage device of claim 4, wherein the maximum number of open and active streams is further determined based on a number of temporary locations in the SRAM unit.

6. The storage device of claim 5, wherein the controller is further configured to:
   generate new first parity data for the first stream in a first temporary location in the SRAM unit;
   copy previous first parity data for the first open and active stream from the DRAM unit to a first location in the SRAM unit while generating the new first parity data;
   update the previous first parity data with the new first parity data in the SRAM unit; and
   copy the updated first parity data from the SRAM unit to the DRAM unit when a controller buffer area of the SRAM unit is filled to capacity, the controller buffer area temporarily storing data to be written to the non-volatile storage unit.

7. The storage device of claim 6, wherein the maximum number of open and active streams is further determined based on an amount of time the generating the new first parity data, copying the previous first parity data, and updating the previous first parity data takes.

8. A storage device, comprising:
   a non-volatile storage unit, wherein a capacity of the non-volatile storage unit is divided into a plurality of streams, and wherein the non-volatile storage unit comprises a plurality of dies, each of the plurality of dies comprising a plurality of erase blocks;
   a first volatile memory unit; and
   a controller coupled to the non-volatile storage unit and the first volatile memory unit, the controller comprising a second volatile memory unit, wherein the controller is configured to:
   set a maximum number of open and active streams, wherein the maximum number of open and active streams is determined based on an amount of time it takes to change a first stream of the plurality of streams to a closed or resource conserved lower performance internal state and to change a second stream of the plurality of streams to an open and active state;
   receive one or more commands to write data to one or more open and active streams of the plurality of streams;
   generate new first parity data for a first open and active stream in a temporary location of one or more temporary locations in the second volatile memory unit;
   copy previous first parity data for the first open and active stream from the first volatile memory unit to a first location in the second volatile memory unit; and
   update the previous first parity data with the new first parity data in the second volatile memory unit, wherein an amount of time the generating the new first parity data, copying the previous first parity data, and updating the previous first parity data takes further determines the maximum number of open and active streams.

9. The storage device of claim 8, wherein the controller is further configured to:
   determine the first open and active stream is a least recently used stream of the open and active streams upon receiving one or more second commands to write data to a third stream, the third stream being in the closed or resource conserved lower performance internal state;
   change the first open and active stream to the closed or resource conserved lower performance internal state; and change the third stream to the open and active state.

10. The storage device of claim 9, wherein the controller is further configured to change the least recently used stream to the closed or resource conserved lower performance internal state only after a predetermined amount of time has expired.

11. The storage device of claim 9, wherein the controller comprises one or more controller buffer regions, and wherein the one or more commands received to write data to the one or more open and active streams of the plurality of streams fill the one or more controller buffer regions to capacity.

12. The storage device of claim 8, wherein the maximum number of open and active streams is further determined based on a number of temporary locations in the second volatile memory unit.

13. The storage device of claim 8, wherein the second volatile memory is a SRAM unit and the first volatile memory is a DRAM unit.

14. A storage device, comprising:
 a non-volatile storage unit, wherein a capacity of the non-volatile storage unit is divided into a plurality of streams, and wherein the non-volatile storage unit comprises a plurality of dies, each of the plurality of dies comprising a plurality of erase blocks;
 a first volatile memory unit; and
 a controller coupled to the non-volatile storage unit and the first volatile memory unit, the controller comprising a second volatile memory unit, the second volatile memory comprising one or more temporary locations, wherein the controller is configured to:
  set a maximum number of open and active streams, wherein the maximum number of open and active streams is determined based on a number of temporary locations in the second volatile memory, and wherein the maximum number of open and active streams is further determined based on an amount of time it takes to change a least recently used stream to the closed or resource conserved lower performance internal state and to change a first stream of the plurality of streams to an open and active state;
  receive one or more first commands to write data to one or more open and active streams of the plurality of streams;
  generate new first parity data for a first open and active stream in a first temporary location in the second volatile memory unit;
  change a second open and active stream to the closed or resource conserved lower performance internal state upon receiving one or more second commands to write data to a closed stream; and
  change the closed stream to the open and active state.

15. The storage device of claim 14, wherein the controller is further configured to:
 copy previous first parity data for the first open and active stream from the first volatile memory unit to a first location in the second volatile memory unit while generating the new first parity data; and
 update the previous first parity data with the new first parity data in the second volatile memory unit.

16. The storage device of claim 15, wherein the maximum number of open and active streams is further determined based on an amount of time the generating the new first parity data, copying the previous first parity data, and updating the previous first parity data takes, and an amount of time it takes to change the second open and active stream to the closed or resource conserved lower performance internal state and to change the closed stream to an open and active state.

17. The storage device of claim 14, wherein the controller is further configured to determine that the second open and active stream is the open and active stream that was least recently used.

18. The storage device of claim 14, wherein the controller is further configured to change an open and active stream to the closed or resource conserved lower performance internal state after a predetermined amount of time has expired, wherein the predetermined amount of time is about 0.5 seconds to about 5 seconds, and wherein the maximum number of open and active streams is further determined based on the predetermined amount of time.

\* \* \* \* \*